US012344000B2

(12) United States Patent
Morello

(10) Patent No.: US 12,344,000 B2
(45) Date of Patent: Jul. 1, 2025

(54) CARTRIDGE LID, CARTRIDGE, INK JET PRINT HEAD AND INK JET PRINTER

(71) Applicant: SICPA HOLDING SA, Prilly (CH)

(72) Inventor: Giovanni Morello, Baldissero Canavese (IT)

(73) Assignee: SICPA HOLDING SA, Prilly (CH)

( * ) Notice: Subject to any disclaimer, the term of this patent is extended or adjusted under 35 U.S.C. 154(b) by 145 days.

(21) Appl. No.: 18/274,410

(22) PCT Filed: Jan. 26, 2022

(86) PCT No.: PCT/EP2022/051817
§ 371 (c)(1),
(2) Date: Jul. 26, 2023

(87) PCT Pub. No.: WO2022/162032
PCT Pub. Date: Aug. 4, 2022

(65) Prior Publication Data

US 2024/0308230 A1 Sep. 19, 2024

(30) Foreign Application Priority Data

Jan. 26, 2021 (EP) .................................... 21153589

(51) Int. Cl.
*B41J 2/175* (2006.01)
*B41J 2/14* (2006.01)

(52) U.S. Cl.
CPC ....... *B41J 2/17553* (2013.01); *B41J 2/14016* (2013.01); *B41J 2/17556* (2013.01)

(58) Field of Classification Search
CPC .... B41J 2/175; B41J 2/17503; B41J 2/17506; B41J 2/17513; B41J 2/1753; B41J 2/1754;

(Continued)

(56) References Cited

U.S. PATENT DOCUMENTS

2001/0046400 A1* 11/2001 Hill ...................... B41J 2/17513 400/207
2002/0044184 A1* 4/2002 Kobayashi ........... B41J 2/17506 347/86
2018/0186153 A1 7/2018 Tori et al.

FOREIGN PATENT DOCUMENTS

EP 3302983 11/2020

OTHER PUBLICATIONS

International Search Report and Written Opinion issued with respect to application No. PCT/EP2022/051817.

* cited by examiner

*Primary Examiner* — Anh T Vo
(74) *Attorney, Agent, or Firm* — MUNCY, GEISSLER, OLDS & LOWE, P.C.

(57) ABSTRACT

The present invention relates to the field of ink jet printing technology. The cartridges, whose ink reservoir is in communication with the external environment through a venting hole, are subject to ink leakage when the external pressure changes significantly with respect to the external pressure after ink filling, in particular due to possible air bubbles trapped in the in the ink reservoir. The present invention provides a cartridge lid (15) with an expansion space (25) formed between an outer lid member (40) and an inner lid member (27). The expansion space (25) is in communication with external environment through the venting hole (17) and has an inlet (26) through which ink is able to flow into the expansion space (25). The present invention also provides a cartridge, an ink jet print head and an ink jet printer.

13 Claims, 11 Drawing Sheets a) exploded view    b) exploded view cross section

(58) Field of Classification Search
CPC . B41J 2/17553; B41J 2/17556; B41J 2/14016
See application file for complete search history.

a) exploded view b) exploded view cross section

CARTRIDGE LID, CARTRIDGE, INK JET PRINT HEAD AND INK JET PRINTER

FIELD OF THE INVENTION

The present invention relates to the field of ink jet printing technology, in particular, relates to preventing ink from leaking outside a cartridge from a venting hole due to shipment and/or use of an ink jet print head at an altitude different from that of the factory, and more in particular, relates to a cartridge lid, a cartridge, an ink jet print head and an ink jet printer.

BACKGROUND OF THE INVENTION

As illustrated in FIGS. 1 and 2, a cartridge 37 of an ink jet print head comprises a cartridge body 4 and a cartridge lid 15 for covering an opening 38 of the cartridge body 4. An ink reservoir 10 for containing ink is formed within the cartridge body 4. The cartridge body 4 further comprises an ink flow aperture 13 communicating the ink reservoir 10 with the ejection chambers of the ink jet print head, wherein the ink flow aperture 13 is in communication with the ink reservoir 10 through a filter 12 and a pipe 11.

The ink flow through ejection nozzles of ejection chambers of an ink jet print head must be accurately controlled, because it's one of the essential prerequisites for achieving high-end quality prints with an ink jet printer. One system that assists in providing this amount of control of the ink flow is a backpressure system which creates a slightly negative pressure in the liquid contained within an ink reservoir of a cartridge of the ink jet print head. The negative pressure in the liquid prevents unintentional leakage of ink. Otherwise, such a leakage may occur when the ink jet print head using the ink is idle or the cartridge is exposed to sudden accelerations during the handling.

As illustrated in FIGS. 1 and 2, a possible backpressure system that is well known in the art employs a porous member 14 (e.g. an open-cell foam), a fibrous member or a combination of the two members inserted into the ink reservoir 10 of the cartridge 37 to create negative pressure in the liquid contained within the ink reservoir 10 produced by the capillary effect of the network of pores or between the fibers, as described in the patent EP 3302983 B1.

When the backpressure is generated by the capillary force, originating from the porous member 14 inserted into the ink reservoir 10, the ink reservoir 10 must be in communication with the external environment. In other words, the boundary liquid surface within the porous member 14 must be at the atmospheric pressure. If the ink reservoir 10 is not in communication with the external environment, while the ink level in the ink reservoir 10 decreases because of the ink ejection during the printing, the pressure of the liquid contained in the ink reservoir 10 would drop down far beyond the suitable backpressure value, preventing the ink jet print head from ejecting further.

To provide a suitable communication with the external environment, the cartridge lid 15 is generally provided with a venting hole 17 except for an ink filling hole 16. Specifically, as illustrated in FIGS. 1, 2 and 3, the cartridge lid 15 is provided with an ink filling hole 16 through which a needle penetrates most the way across the porous member 14 for filling the ink reservoir 10 with ink and a venting hole 17 for communicating the ink reservoir 10 with the external environment. The venting hole 17 is disposed at one end of a shallow serpentine venting channel 18 which is molded in the outer surface of the cartridge lid 15. The ink filling hole

16 is quite large and is closed after (ink) filling with an adhesive label 19 or with a plug (not illustrated) to prevent the excessive evaporation of the ink. The adhesive label 19 overlaps not only the ink filling hole 16, but also the venting hole 17. The adhesive label 19 closes atop most of the shallow serpentine venting channel 18, acting as a ceiling surface. The venting outlet 20 at the very end portion of the shallow serpentine venting channel 18 remains uncovered, allowing the ink reservoir 10 to get in communication with the external environment. The small cross section and the suitable length of the shallow serpentine venting channel 18 keep the evaporation rate low, at the same time maintain the pressure balance between the inside and outside of the ink reservoir 10 even during printing. Of course, also two separated labels (not illustrated) could be suitably used for the ink filling hole 16 and the venting hole 17, respectively. The inner surface of the cartridge lid 15, as illustrated in FIG. 4, besides the ink filling hole 16 and the venting hole 17 is generally provided with a peripheral sealing frame 22 suitable for ultrasonic bonding with the cartridge body 4 and a plurality of ribs 23 and an additional outer perimetrical reinforcing frame 41, which are designed to strengthen suitably the cartridge lid 15, preventing any deformation or break of the cartridge lid 15. Normally such ribs 23 and outer perimetrical reinforcing frame 41 are obtained at once during molding process of the cartridge lid 15.

The ink filled into the ink reservoir 10 soaks a large portion of the porous member 14. The capillary force prevents the ink from getting out of the porous member 14. Nevertheless, the ink has a certain amount of inner mobility across the porous member 14, in particularly when the porous member 14 is a fibrous member that easily allows the ink movement along the fiber direction. Thus, the handling of an ink jet print head filled with ink could cause some air to be trapped into the porous member 14. This trapped air could even possibly be surrounded by the ink. Some additional trapping of air could even happen in the pipes 11 because of possible wrong operations or lack of hermetic sealing between the ink filling hole 16 and the needle during the ink filling phase. Briefly, there is a certain possibility that, in an ink jet print head, some islands of air remain trapped within the ink.

After filling, the atmospheric pressure that surrounds the ink jet print head is present also within the portion of the ink reservoir 10 which is devoid of ink, whilst in the liquid contained in the ink jet print head the resulting pressure is due to the atmospheric pressure, increased by the hydrostatic pressure of the liquid column and diminished by the capillary pressure of the porous member 14. The capillarity of the porous member 14, which depends on the pore size, as well as on the surface tension of the ink and the wettability of the porous member material, is carefully designed so as to provide a lower pressure for the liquid contained in the ink reservoir with respect to the external environment.

Before the ink jet print head is ready for shipment, the ejection nozzle is sealed with a suitable adhesive tape, in order to prevent the ink evaporation and to protect the ejection nozzle from particle contamination or mechanical scratches. The ink jet print head is finally placed in a plastic cup and thermally sealed with a double layer plastic-aluminum packing cover. As a result, the ink jet print head turns out to be enclosed in a hermetic container whose internal pressure is the same as the atmospheric pressure at the factory.

However, during shipping the ink jet print head or when the ink jet print head is to be used in high altitude areas, the hermetic container can be subjected to significant pressure changes. For example, in an air shipment, the cargo hold can be brought to a low pressure during the flight. For another example, the final destination of the ink jet print head could lie at an environmental pressure very different from that of the factory due to different altitudes. Changes in the environmental pressure of the hermetic container can cause an unbalance between the inner pressure of the hermetic container and the environmental pressure. The unbalanced inner pressure of the hermetic container pulls outwards the packing cover, so that the inner pressure of the hermetic container is lowered with respect to the original pressure in the factory.

Since the ink reservoir is in communication via the venting hole with the region outside the cartridge, the air trapped within the porous member could expand if the environment is at a lower pressure than the factory's one, pulling out the ink, which could leak out from the venting hole, either when the cartridge is within the hermetic container or when the final user flips off the packing cover.

Sealing the venting outlet with an additional label or a removable plug could work only to prevent the ink from leaking within the sealed cup, but it wouldn't work if the final destination pressure is significantly lower than the factory's one: removing the additional label or the plug would cause a sudden unbalance of the inner pressure, spraying the ink outside the venting outlet. Such a phenomenon would likely arise also if no air is trapped within the porous member. The abrupt perturbation of the inner pressure of the hermetic container could easily produce an ink spray out of the venting hole anyhow, because the communication between the liquid surface in the ink reservoir and the outside takes place via a short distance and the ink can flow outwards almost directly.

The situation where the ink sprays out of the venting hole 17 is schematically depicted in FIG. 2. The reciprocal position of the ink reservoir 10 and the cartridge lid 15 is illustrated in an exploded view, where the abrupt ink stream 21, caused by the pressure unbalance, is schematically represented by the arrows. The ink covers rapidly the short and direct travel towards the ink filling hole 16 and the venting hole 17 of the cartridge lid 5. The ink filling hole 16 is sealed by the adhesive label 19 (FIG. 3, b), which also overlaps the venting hole 17 and most of the shallow serpentine venting channel 18, leaving a venting outlet 20 in communication with the outside. The volume of the shallow serpentine venting channel 18 under the adhesive label 19 is very small and can be rapidly filled by the ink, which turns out to spray out from the venting outlet 20 at the very end portion of the shallow serpentine venting channel 18.

SUMMARY OF THE INVENTION

In order to solve the above technical problems, the solution of the present invention consists of providing a cartridge lid with an expansion space connected with the venting hole, in order to gather any possible ink stream caused by an unbalance between the inner pressure of the ink reservoir and the environmental pressure outside the ink reservoir due to environmental pressure changes, preventing the ink from leaking outside the cartridge.

In one aspect of the present invention, a cartridge lid is provided. The cartridge lid comprises an outer lid member and an inner lid member. The outer lid member is provided with an ink filling hole and a venting hole. The inner lid member is attached to the outer lid member and overlaps the venting hole. Wherein an expansion space is formed between the outer lid member and the inner lid member, the expansion space has an inlet through which ink is able to flow into the expansion space, and the expansion space is in communication with external environment through the venting hole.

The cartridge lid of the present invention can prevent the ink from reaching the region outside the cartridge in a short travel, through a direct communication. On the contrary, the ink is forced to go through a longer expansion space, damping the vehemence of the possible spray and providing an inner expansion volume or inner expansion space, able to contain all or most of the ink displaced due to the pressure unbalance.

Preferably, the expansion space is an expansion circuit which is circuitous. Giving the expansion space a circuitous shape would enhance both the dumping effect and the available volume needed to go through. The circuitous expansion circuit forces the ink flowing into the expansion space from the inlet need to go through a longer flow path and take more time before spraying out from the venting hole.

Preferably, the expansion space contains porous material. The porous material could enhance the damping of the ink flow vehemence, without compromising the fluidic communication with the outside.

Preferably, the expansion space comprises a plurality of expansion chambers fluidly communicated through narrow communication passageways, and each expansion chambers are surrounded by chamber walls connected to the outer lid member and the inner lid member. The abrupt change in width along the expansion circuit, due to the plurality of narrow communication passageways, contributes to the flow damping.

Preferably, the chamber walls comprise two curvilinear walls surrounding the venting hole.

Preferably, two neighboring chamber walls are spaced apart from each other to form the narrow communication passageways.

Preferably, the narrow communication passageway(s) is/are formed in the chamber wall(s).

Preferably, the inner lid member is parallel to the outer lid member.

In the second aspect of the present invention, a cartridge is provided. The cartridge comprises a cartridge body and a cartridge lid mentioned above. The cartridge body has an opening and an ink flow aperture. An ink reservoir for containing ink is formed within the cartridge body. The cartridge lid covers the opening.

Preferably, the cartridge comprises a porous member and/or a fibrous member inserted into the ink reservoir.

In the third aspect of the present invention, an ink jet print head is provided. The ink jet print head comprises the cartridge mentioned above.

Preferably, the ink jet print head is a thermal ink jet print head comprising a microfluidic device attached to the cartridge. The microfluidic device comprises a plurality of resistors, a plurality of ejection chambers and a nozzle plate. The plurality of ejection chambers are disposed above the resistors and in fluid communication with the ink flow aperture. The nozzle plate covers the ejection chambers and is provided with ejection nozzles for spraying ink from the ejection chambers.

In the fourth aspect of the present invention, an ink jet printer comprising the ink jet print head mentioned above is provided.

BRIEF DESCRIPTION OF THE DRAWINGS

Non-restrictive and non-exhaustive embodiments of the present invention will be described by examples referring to the drawings below, wherein:

FIG. 3, b) illustrates a schematic diagram of the outer surface of the cartridge lid of the cartridge in FIG. 1.

DETAILED DESCRIPTION OF THE EMBODIMENTS

In order to make the above and other features and advantages of the invention clearer, the invention is further described in combination with the attached drawings below. It is to be understood that the specific embodiments of the present invention are illustrative and not intended to be restrictive.

Figure 5:
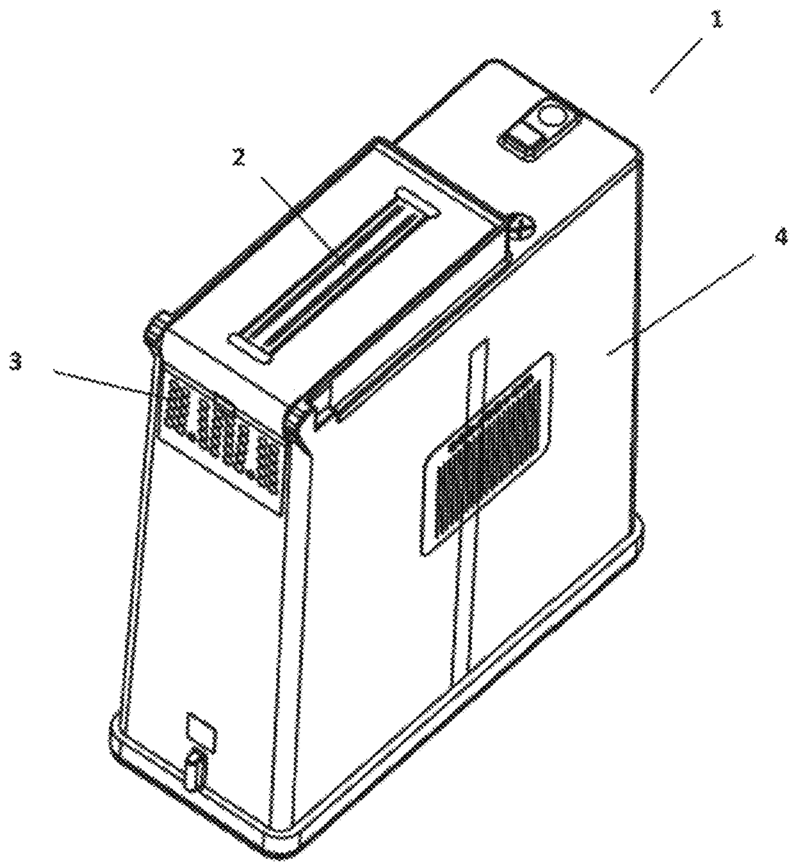
FIG. 5 illustrates a perspective schematic view of an ink jet print head according to an embodiment of the present invention.

The present invention provides a cartridge lid, a cartridge, an ink jet print head and an ink jet printer. FIG. 5 illustrates a perspective schematic view of an ink jet print head 1 according to an embodiment of the present invention. In the present embodiment, the ink jet print head 1 is a thermal ink jet print head, such as a bubble ink jet print head. In other embodiments, the ink jet print head 1 may also be a piezoelectric ink jet print head.

Figure 6:
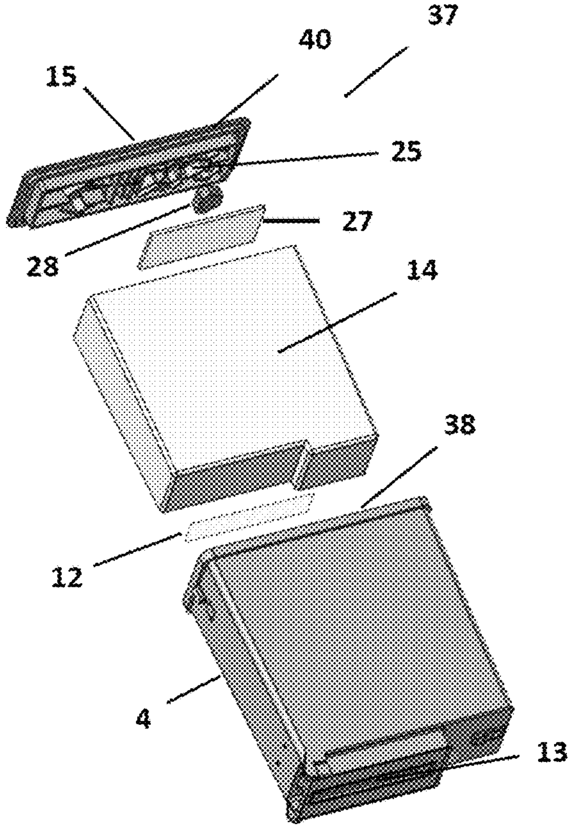
FIG. 6 illustrates exploded views of a cartridge of the ink jet print head in FIG. 5
Figure 6:
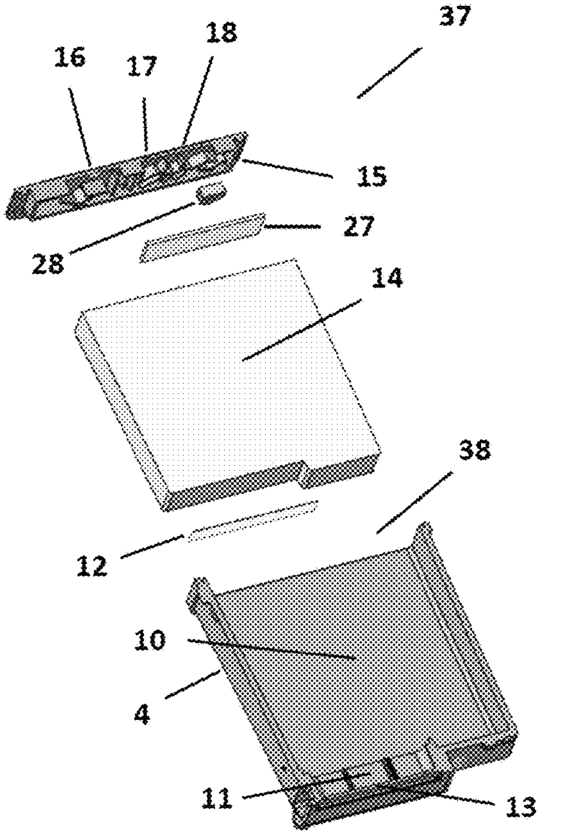

As illustrated in FIGS. 5, 6, a) and 6, b), the ink jet print head 1 comprises one or more cartridges 37. The cartridges 37 may contain ink with different colors respectively. The cartridge 37 comprises a cartridge body 4 which is generally made of plastic material. The cartridge body 4 has an opening 38 and an ink flow aperture 13. An ink reservoir 10 for containing ink is formed within the cartridge body 4. A filtering device 12 is provided between the ink flow aperture 13 and the ink reservoir 10. In this embodiment, the filtering device 12 is a mesh filter. Optionally, the filtering device 12 is in communication with the ink flow aperture 13 through a pipe 11 (for example, a standpipe) which is topped with the filtering device 12 at the boundary with the ink reservoir 10 and terminates at the other end with the ink flow aperture 13.

As illustrated in FIG. 5, the ink jet print head 1 further comprises a microfluidic device 2 attached to the cartridge 37. For example, the microfluidic device 2 is adhered to the cartridge body 4 of the cartridge 37 through a sealing glue, which provides the joint between the microfluidic device 2 and the cartridge 37 with both mechanical strength and hermeticity. The microfluidic device 2 is in fluid communication with the ink flow aperture 13 of the cartridge 37 so that the ink contained in the ink reservoir 10 of the cartridge 37 can flow to the microfluidic device 2 via the ink flow aperture 13. The microfluidic device 2 is electrically activated through contact pads 3.

Figure 7:
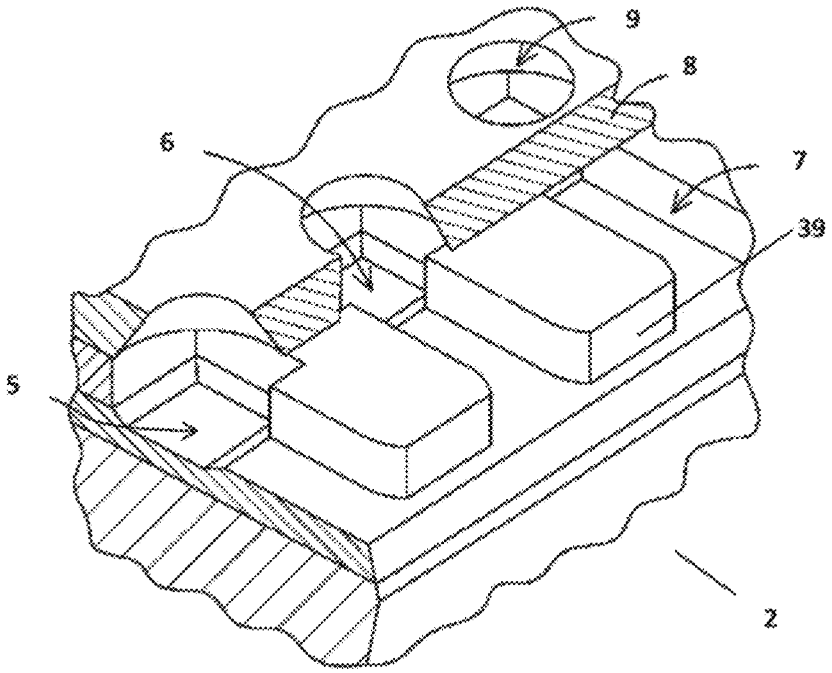
FIG. 7 illustrates a partial section schematic view of a microfluidic device of the ink jet print head in FIG. 5.
Figure 8:
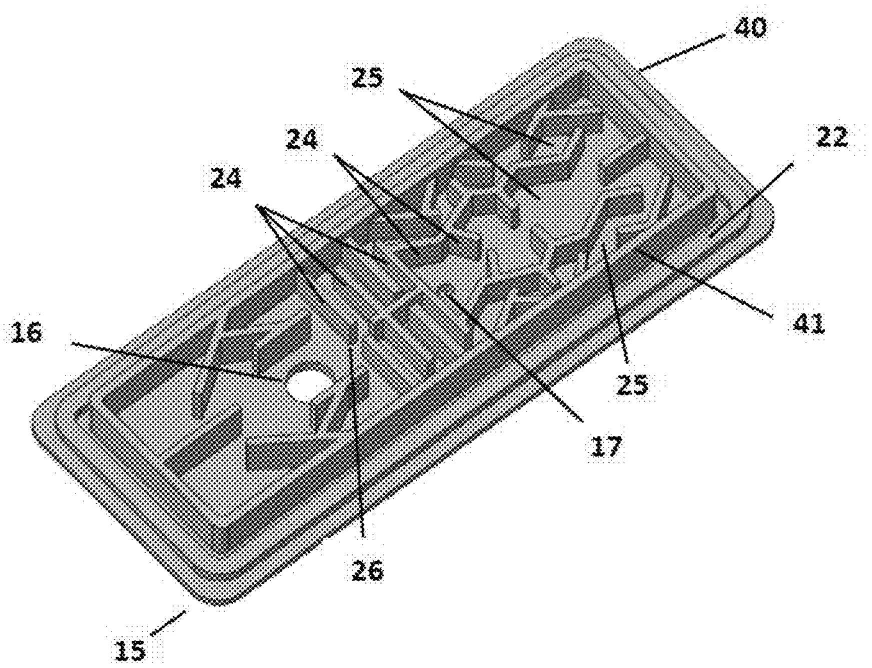
FIG. 8 illustrates a perspective schematic diagram of the cartridge lid according to one embodiment of the present invention, with the inner lid member removed.
Figure 9:
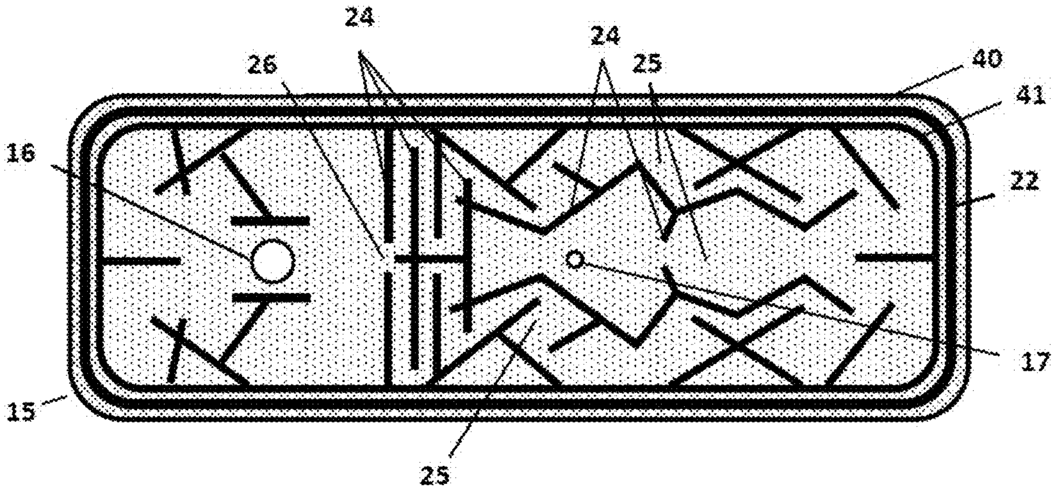
FIG. 9 illustrates a bottom view of the outer lid member of the cartridge lid according to one embodiment of the present invention.
Figure 10:
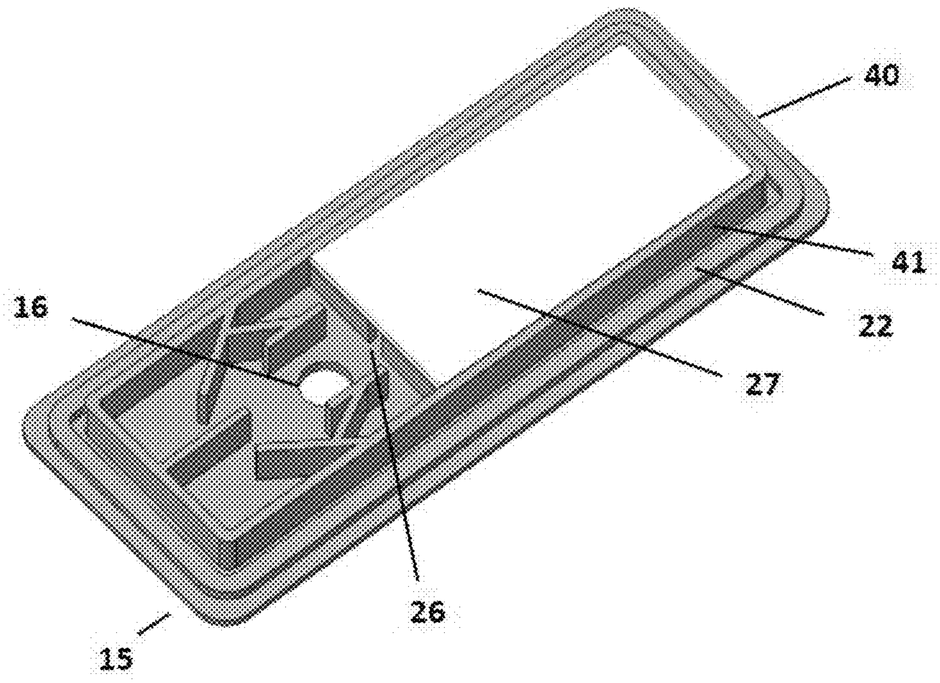
FIG. 10 illustrates a perspective schematic diagram of the cartridge lid according to one embodiment of the present invention.
Figure 11:
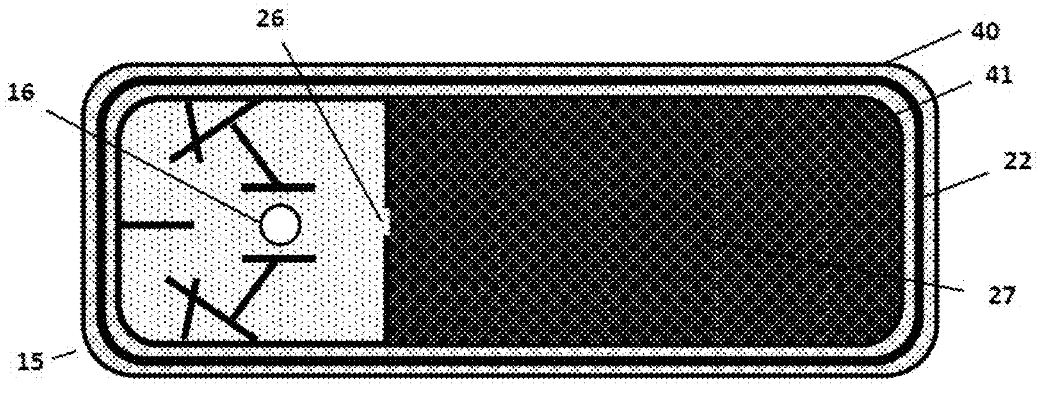
FIG. 11 illustrates a bottom view of the cartridge lid of the cartridge according to one embodiment of the present invention.
Figure 12:
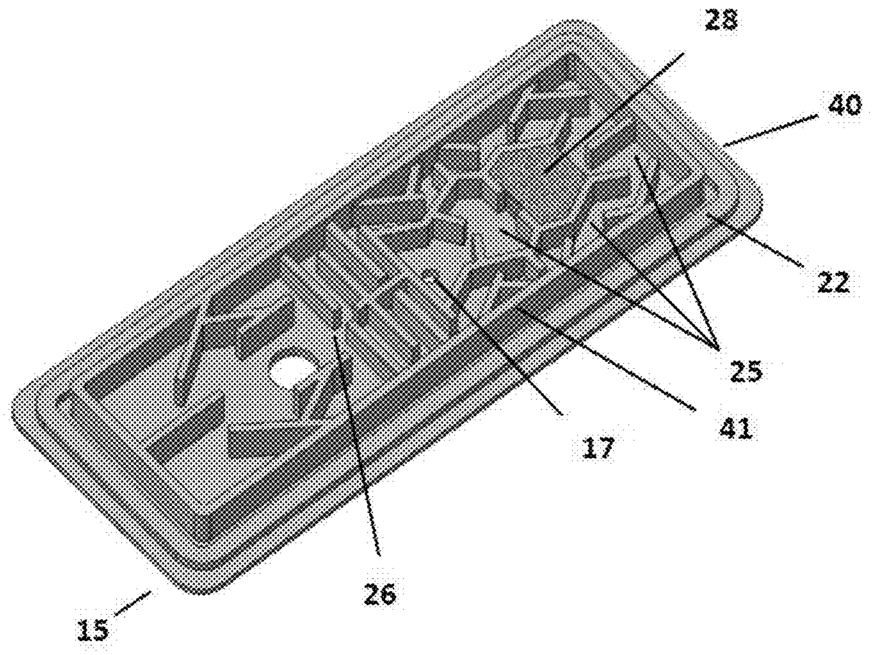
FIG. 12 illustrates a perspective schematic diagram of the cartridge lid according to another embodiment of the present invention, with the inner lid member removed.
Figure 13:
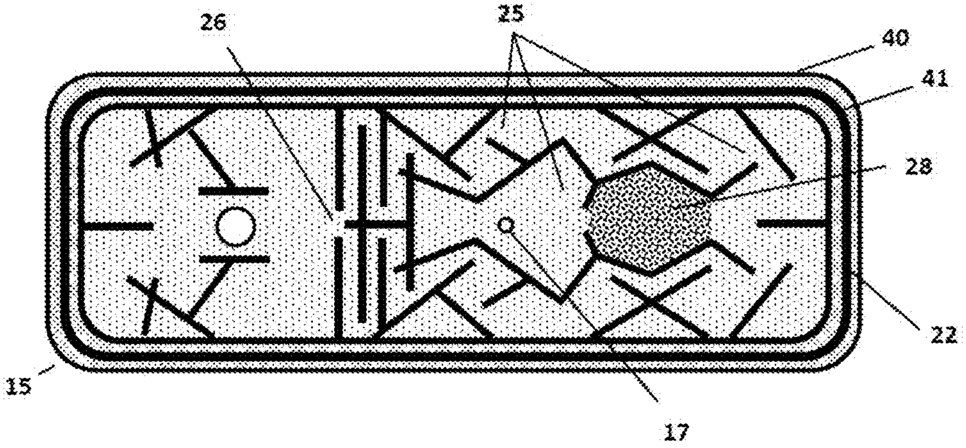
FIG. 13 illustrates a bottom view of the outer lid member of the cartridge lid according to another embodiment of the present invention.

As illustrated in FIG. 7, the microfluidic device 2 comprises a plurality of ejection chambers 6 and a plurality of resistors 5 which are in correspondence with the plurality of ejection chambers 6. The ejection chambers 6 are disposed above the resistors 5 and are a part of the fluidic circuit 7 which is in fluid communication with the ink flow aperture 13 of the cartridge 37. Therefore, it can be said that the ejection chamber 6 is in fluid communication with the ink flow aperture 13. The ink from the ink flow aperture 13 flows in the fluid circuit 7 and reaches the ejection chambers 6. The fluid circuit 7 is patterned in a suitable polymer layer called a barrier layer 39. A nozzle plate 8 is disposed on the barrier layer 39 and closes at the top the microfluidic device 2. The nozzle plate 8 also covers the ejection chambers 6. The nozzle plate 8 is provided with an ejection nozzle 9 for each ejection chamber 6. The ejection nozzles 9 are used for spraying ink from the ejection chambers 6. Specifically, a sudden current pulse can be applied on demand through resistors 5, causing the rapid vaporization of a thin layer of the ink. The high value of the vapor pressure causes the expansion of the vapor bubble, which pulls the ink above out of the ejection nozzles 9, producing in turn the ejection of ink droplets. After the ejection, new ink is recalled from the ink reservoir 10 to refill the ejection chambers 6 and the ejection nozzles 9 again.

As mentioned above, a backpressure system is used in the ink jet print head 1 to assist in providing the control of the ink flow. In this embodiment, as illustrated in FIGS. 6, a) and 6, b), a porous member 14 (e.g. an open-cell foam) and/or a fibrous member may be inserted into the ink reservoir 10 to create negative pressure in the liquid contained within the ink reservoir 10 produced by the capillary effect of the network of pores or between the fibers. However, other methods could be used to generate a suitable backpressure in the liquid. For example, it could be used a blister with an opening, which is in fluidic communication with the pipe and the ejection chambers; the blister shell is mechanically biased outwardly through a metal spring or some other elastic element. The blister is fluidly isolated from the external environment, apart from the communication opening with the pipe. The elastic component must be carefully calibrated in order to provide the suitable backpressure during the whole lifetime of the ink jet print head.

As illustrated in FIGS. 6, a) and 6, b). The cartridge 37 further comprises a cartridge lid 15 for covering the opening 38 of the cartridge body 4. Specifically, a peripheral sealing frame 22 of the cartridge lid 15 may be bonded with the cartridge body 4 so that the opening 38 of the cartridge body 4 is covered by the cartridge lid 15. To eliminate or, at least, mitigate the effect of an unbalance between the pressure inside the cartridge 37 and the pressure outside the cartridge 37, a specific ink expansion volume or expansion space 25 is created in the cartridge lid 15. The purpose is to prevent the ink from reaching the region outside the cartridge 37 in a short travel, through a direct communication. On the contrary, the ink is forced to go through a longer expansion space 25, in particular a circuitous expansion path or expansion circuit before reaching the venting hole 17, damping the vehemence of the possible spray and providing an inner expansion volume or inner expansion space 25, able to contain all or most of the ink displaced due to the pressure unbalance.

As illustrated in FIGS. 6, a) and 6, b) and 8-11, the cartridge lid 15 comprises an outer lid member 40 and an inner lid member 27 attached to the outer lid member 40. It should be noted that the terms describing the positional relationship mentioned herein such as "outer", "inner", "upper" and "lower" are described with respect to the case where the cartridge lid 15 covers the opening 38 of the cartridge body 4. The outer lid member 40 is provided with an ink filling hole 16 for filling ink into the ink reservoir 10 of the cartridge 37 and a venting hole 17 for communicating the ink reservoir 10 of the cartridge 37 with the external environment. The venting hole 17 is disposed at one end of a shallow serpentine venting channel 18 which is molded in the outer surface of the outer lid member 40. The ink filling hole 16 is large, through which an ink filling tool such as a needle can pass to fill ink into the ink reservoir 10. The inner lid member 27 is provided on the inner side of the outer lid member 40 and overlaps the venting hole 17. It can be understood that the inner lid member 27 does not overlap the ink filling hole 16 to avoid affecting the ink filling through the ink filling hole 16. An expansion space 25 which has an inlet 26 is formed between the outer lid member 40 and the inner lid member 27. The expansion space 25 is in communication with external environment through the venting hole 17. The inlet 26 may be provided at the opposite side with respect to the venting hole 17, for example, the inlet 26 may be provided in the inner lid member 27. Alternatively, the inlet 26 may also be provided between the outer lid member 40 and the inner lid member 27. When the cartridge lid 15 covers the opening 38 of the cartridge body 4, the inlet 26 allows the ink from the ink reservoir 10 to flow into the expansion space 25, and the venting hole 17 put the expansion space 25 in communication with the external environment. The inner surface (e.g. the lower surface) of the outer lid member 40 acts as the ceiling of the expansion space 25, whilst the outer surface (e.g. the upper surface) of the inner lid member 27 acts as the floor of the expansion space 25. In one possible embodiment, the inner lid member 27 is parallel to the outer lid member 40. The inner lid member 27 can be detachably attached to the outer lid member 40. The inner lid member 27 can also be bond to the outer lid member 40 using some suitable glue or adhesive or ultrasonic welding, or any other method well known in the art. Furthermore, the inner lid member 27 could even be realized through molding, as the rest of the cartridge lid 15, but the fabrication process would end up being very complicated and expensive.

Preferably, the expansion space 25 is an expansion circuit which is circuitous. Giving the expansion space 25 a circuitous shape would enhance both the dumping effect and the available volume needed to go through. The circuitous expansion circuit forces the ink flowing into the expansion space 25 from the inlet 26 need to go through a longer flow path and take more time before spraying out from the venting hole 17.

One kind of the circuitous expansion circuit can be considered as a sequence of expansion chambers put in communication through narrow communication passageways. Specifically, as illustrated in FIGS. 8 to 13, the expansion space 25 may comprise a plurality of expansion chambers which are fluidly communicated through narrow communication passageways. For example, with reference to FIG. 14, the expansion chambers 31 and 32 are put in communication through the narrow communication passageway 33. The abrupt change in width along the expansion circuit, due to the plurality of narrow communication passageways 33, contributes to the flow damping.

Figure 1:
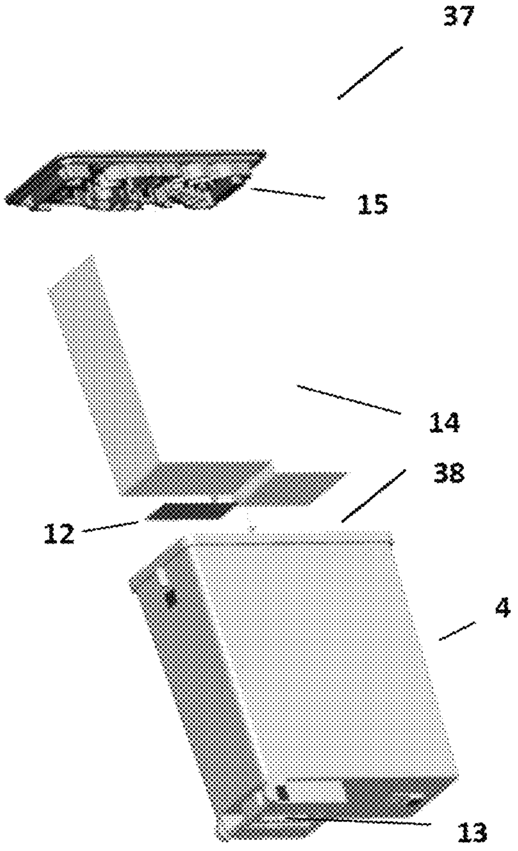
FIG. 1 illustrates exploded views of a known cartridge.
Figure 1:
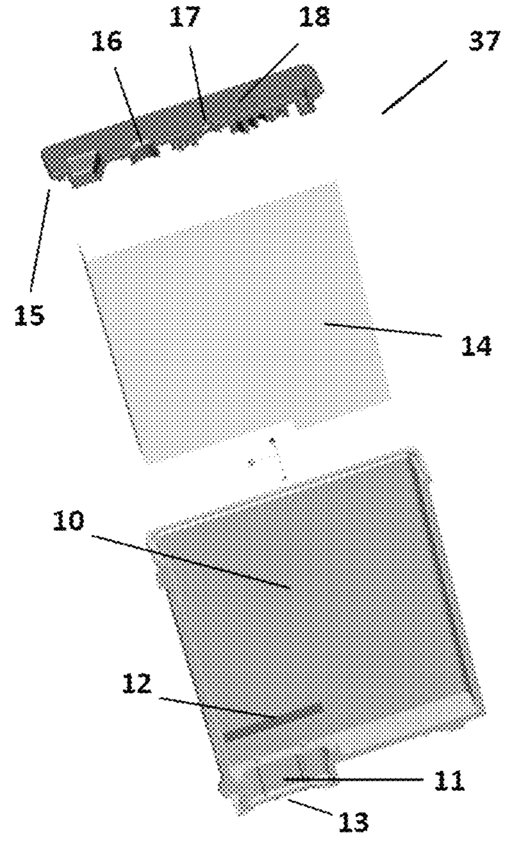
Figure 2:
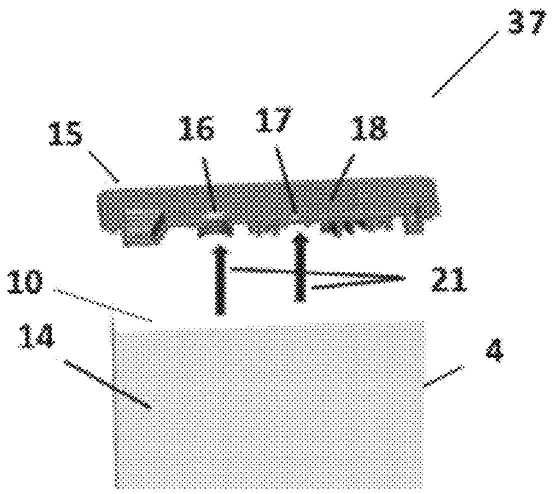
FIG. 2 illustrates a schematic diagram of the cartridge in FIGS. 1*a* and 1*b*.
Figure 3:
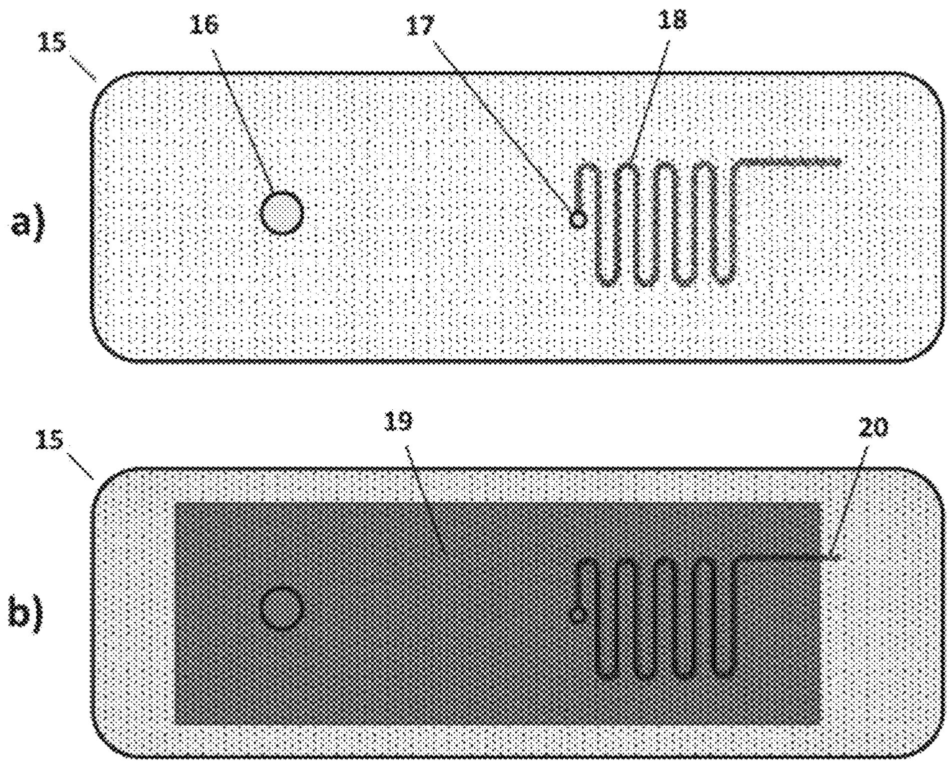
FIG. 3, a) illustrates a schematic diagram of the outer surface of a cartridge lid of the cartridge in FIG. 1, with the adhesive label removed.
Figure 4:
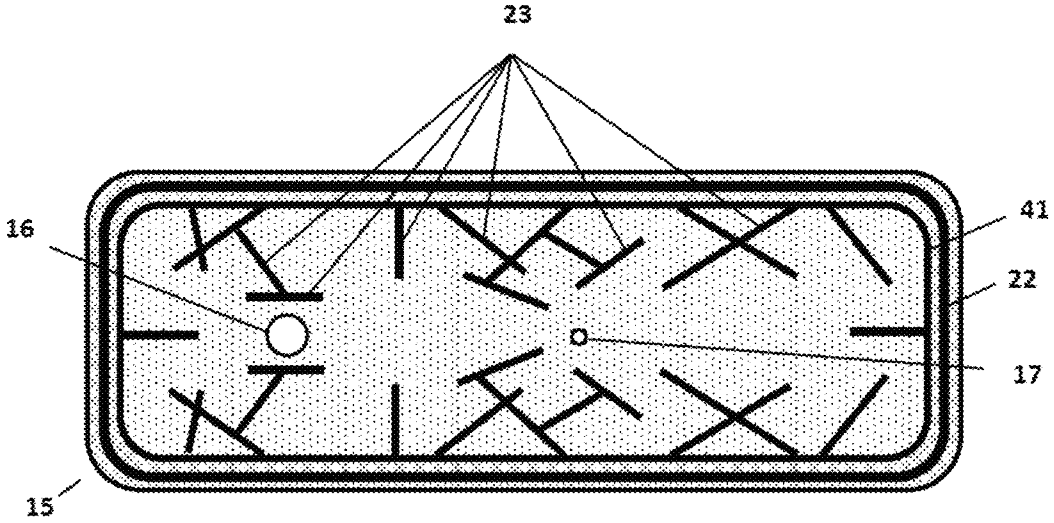
FIG. 4 illustrates a bottom view the cartridge lid of a known cartridge.

The expansion chambers can be surrounded by chamber walls 24 and by the outer perimetrical reinforcing frame 41, connected in turn to the outer lid member 40 and the inner lid member 27. The outer lid member 40 and the inner lid member 27 can be connected with the chamber walls 24 and the outer perimetrical reinforcing frame 41 without affecting the peripheral sealing frame 22. The chamber walls 24 can be achieved by modifying the rib design of the existing cartridge lid (one of them is illustrated in FIG. 4) by adding additional parts or modifying length and position of the existing ribs 23, in order to create the chamber walls 24 of the expansion chambers. The chamber walls 24 and the outer perimetrical reinforcing frame 41 can be connected to the outer lid member 40 and the inner lid member 27 using some suitable glue or adhesive or ultrasonic welding, or any other method well known in the art.

Optionally, the expansion space 25 may contain some porous material. For example, in another embodiment illustrated in FIGS. 12 and 13, a portion of the expansion space 25 in the cartridge lid 15 could even contain some porous material 28, in order to enhance the damping of the ink flow vehemence, without compromising the fluidic communication with the outside. The porous material 28 may be contained in only one expansion chamber, or may also be contained in a plurality of expansion chambers or even in all expansion chambers.

Figure 14:
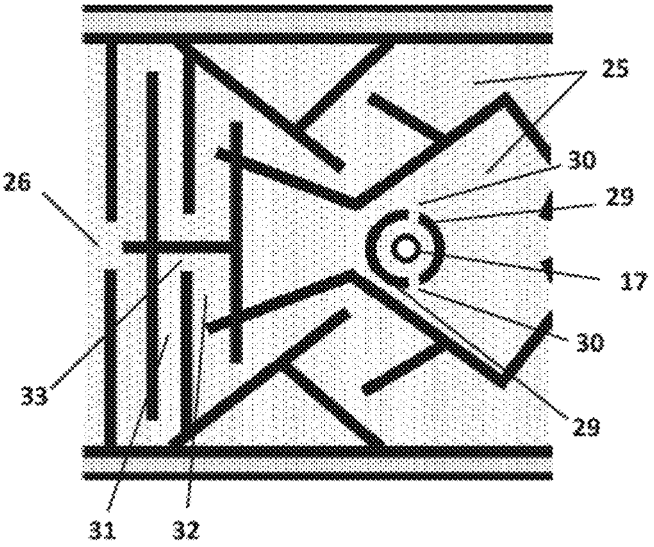
FIG. 14 illustrates a schematic diagram of the inner surface of an outer lid member of the cartridge lid according to still another embodiment of the present invention.

In still another embodiment, some chamber walls of the expansion chambers has a curved profile rather than a rectilinear one, as illustrated in FIG. 14. In this embodiment, the chamber walls comprise two curvilinear walls 29 surrounding the venting hole 17. The two curvilinear walls 29 are spaced apart from each other so that two narrow communication passageways 30 for the ink are formed.

Figure 15:
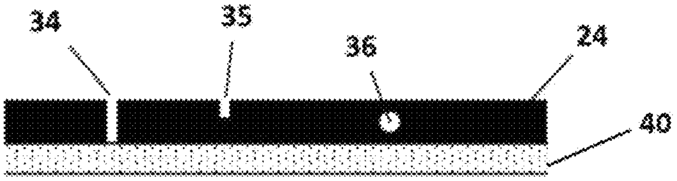
FIG. 15 illustrates a cross section view of the cartridge lid in correspondence with a chamber wall.

The narrow communication passageways can be obtained in different ways, as illustrated in FIG. 15. The cross section of the cartridge lid 15 in correspondence with a chamber wall 24 shows various possible ways to obtain a narrow communication passageway. For example, two neighboring chamber walls 24 are spaced apart from each other and the narrow communication passageway 34 is generated by a gap between two neighboring chamber walls 24, where the gap extends from the outer lid member 40 to the inner lid member 27. For another example, the narrow communication passageway 35 configured as a gap is provided in the chamber wall 24, and the gap doesn't reach the outer lid member 40 but there is a riser connecting the two sides of the gap, resulting in a shallow gap. For yet another example, the narrow communication passageway 36 is completely provided in the chamber wall 24 and configured to be a hole throughout the chamber wall 24. The first two variants can be easily obtained with a standard molding process, whilst the latter requires a more complicated manufacturing process. Anyhow, all of them can be profitably adopted.

The described embodiments are just examples of the concept of the present invention. The detailed features of the expansion space or expansion circuit could be varied or merged suitably according to the different solutions, without departing from the spirit and scope of the invention. The expansion space integrated in the cartridge lid for the cartridge of the ink jet print head addresses effectively the issues caused by the pressure unbalance between the inside and the outside of the ink reservoir, fixing the logistical drawbacks and enabling the correct use of the ink jet print head at different altitudes.

Various technical features described above may be combined arbitrarily. Although not all of possible combinations of various technical features are described, but all the combinations of these technical features should be regarded as within the scope described in the present specification provided that they do not conflict.

Notwithstanding the description of the invention in combination with embodiments, those skilled in the art shall understand that the above description and drawings are only illustrative and not restrictive and the invention is not limited to the embodiments disclosed. Various modifications and variations are possible without departing from the concept of the invention.

LIST OF DESIGNATIONS

1 ink jet print head
2 microfluidic device
3 contact pad
4 cartridge body
5 resistor
6 ejection chamber
7 fluidic circuit
8 nozzle plate
9 ejection nozzle
10 ink reservoir
11 pipe
12 filtering device
13 ink flow aperture
14 porous member
15 cartridge lid
16 ink filling hole
17 venting hole
18 shallow serpentine venting channel
19 adhesive label
20 venting outlet
21 ink stream
22 peripheral sealing frame
23 rib
24 chamber wall
25 expansion space
26 inlet
27 inner lid member
28 porous material
29 curvilinear wall
30 narrow communication passageway
31 expansion chamber
32 expansion chamber
33 narrow communication passageway
34 narrow communication passageway
35 narrow communication passageway
36 narrow communication passageway
37 cartridge
38 opening
39 barrier layer
40 outer lid member
41 outer perimetrical reinforcing frame

What is claimed is:

1. A cartridge lid, comprising:

an outer lid member provided with an ink filling hole and a venting hole; and an inner lid member attached to the outer lid member and overlapping the venting hole;

wherein an expansion space is formed between the outer lid member and the inner lid member, the expansion space has an inlet through which ink is able to flow into the expansion space, and the expansion space is in communication with external environment through the venting hole.

2. The cartridge lid according to claim 1, wherein the expansion space is an expansion circuit which is circuitous.

3. The cartridge lid according to claim 1, wherein the expansion space contains porous material.

4. The cartridge lid according to claim 1, wherein the expansion space comprises a plurality of expansion chambers fluidly communicated through narrow communication passageways, and each expansion chambers are surrounded by chamber walls connected to the outer lid member and the inner lid member.

5. The cartridge lid according to claim 4, wherein the chamber walls comprise two curvilinear walls surrounding the venting hole.

6. The cartridge lid according to claim 4, wherein two neighboring chamber walls are spaced apart from each other to form the narrow communication passageways.

7. The cartridge lid according to claim 4, wherein the narrow communication passageway(s) is/are formed in the chamber wall(s).

8. The cartridge lid according to claim 1, wherein the inner lid member is parallel to the outer lid member.

9. A cartridge, comprising:

a cartridge body with an opening and an ink flow aperture, wherein an ink reservoir for containing ink is formed within the cartridge body; and a cartridge lid according to claim 1 for covering the opening.

10. The cartridge according to claim 9, wherein the cartridge comprises a porous member and/or a fibrous member inserted into the ink reservoir.

11. An ink jet print head, comprising a cartridge according to claim 9.

12. The ink jet print head according to claim 11, wherein the ink jet print head is a thermal ink jet print head comprising a microfluidic device attached to the cartridge, the microfluidic device comprising:

a plurality of resistors;

a plurality of ejection chambers disposed above the resistors and in fluid communication with the ink flow aperture; and a nozzle plate covering the ejection chambers and provided with ejection nozzles for spraying ink from the ejection chambers.

13. An ink jet printer, comprising an ink jet print head according to claim 11.

* * * * *